United States Patent Office 2,942,903
Patented June 28, 1960

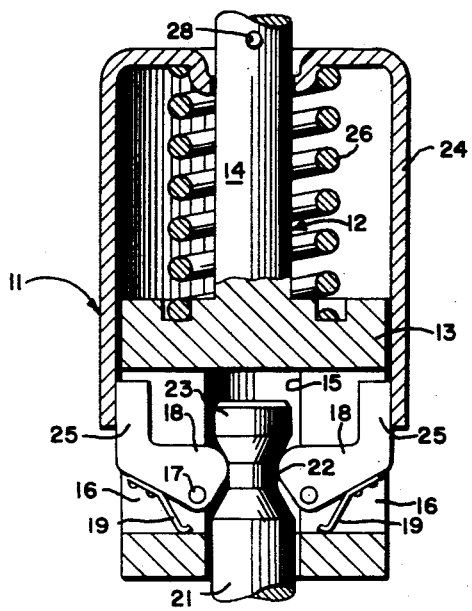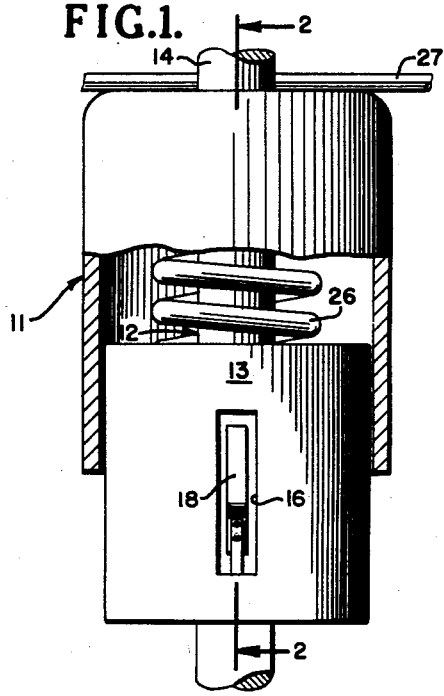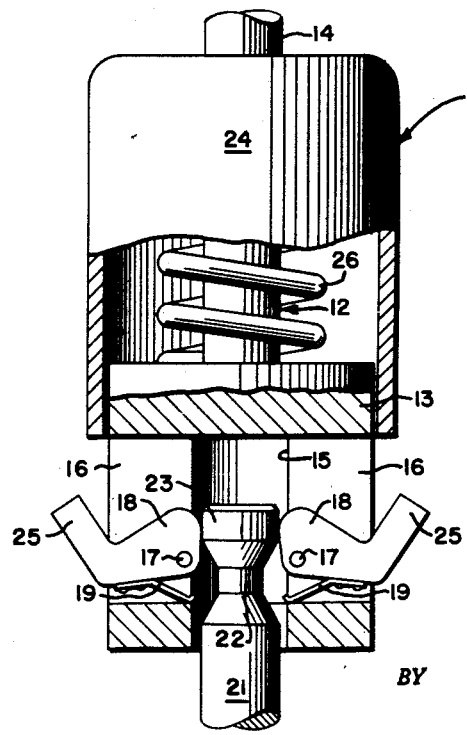

2,942,903

RELEASABLE LOCKING MEANS

Leo V. Giladett, Baltimore, Md., assignor to the United States of America as represented by the Secretary of the Navy Filed Mar. 26, 1957, Ser. No. 648,750

4 Claims. (Cl. 287—119)

(Granted under Title 35, U.S. Code (1952), sec. 266)

The invention described herein may be manufactured and used by or for the Government of the United States of America for governmental purposes without the payment of any royalties thereon or therefor.

The present invention relates to a fastening device for detachably connecting mechanical elements together and more particularly to a releasable lock mechanism for a heavily loaded element in which the force required for release of the element is small.

In known releasable fastening devices of the prior art, extensive use has been made of pivoted levers engaging a headed element and held in engagement therewith by means of a slidable sleeve engaging the levers. However, each of such devices required manual power to effect sliding of the sleeve in order that the element be released. In one common form of such device for supporting a heavily loaded element, the sleeve was pressed by a spring to a position locking a headed element and an elaborate system including links and levers was necessary to move the sleeve against the force of the spring in order to effect release of the headed element.

In attaching heavy loads to a load carrier, the equipment for providing the necessary power to effect such attachment is usually present at the loading site. However, such equipment may not be available or it may not be advantageous to have such equipment present at the time the load is to be released. It is therefore desirable to have such loads releasably connected by mechanisms which require very little manual power to effect release thereof.

The present invention is particularly advantageous in connection with loads provided with a single carrying stem and comprises a plurality of pivoted fingers which engage the stem and are held in such engagement by a slidable sleeve, the sleeve being spring-urged to a position disengaging it from the pivoted fingers thereby effecting release of the loaded stem, the sleeve being held in locking position by means of a retaining means which requires very little manual power for withdrawal thereof. Thus, in order to effect release of the load, it is only necessary to employ sufficient manual power to withdraw a retaining means, such as a wire or the like, the releasable mechanism then operating automatically to effect release of the load.

It is therefore an object of the present invention to provide a releasable lock mechanism which requires comparatively little power to effect release of the mechanism and the load carried thereby.

Another object of the invention is the provision of a lock mechanism having pivoted levers retained in locking position by a slidable sleeve, the sleeve being spring-urged to unlock the levers and retained in locking position by means requiring comparatively little manual power for withdrawal thereof.

A further object of the invention is to provide a releasable lock mechanism for securing a heavy load, the lock mechanism being operated to a release position automatically after retaining means requiring comparatively little manual power have been withdrawn.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

Fig. 1 is a side elevation, partly in section, of the releasable lock mechanism of this invention;

Fig. 2 is a side elevation of the mechanism, in section, the section being taken generally along line 2—2 of Fig. 1; and Fig. 3 is a view somewhat similar to Fig. 2 but with the means for retaining the sleeve in locked position withdrawn and the sleeve moved to a position effecting release of the heavy load.

Referring now to the drawings, wherein like reference characters designate like or corresponding parts throughout the several views, there is shown in Fig. 1 a releasable locking mechanism in accordance with the present invention and generally designated by reference numeral 11. The mechanism 11 comprises a support member 12 which includes a cylindrical base portion 13 and a support rod 14, the base portion 13 being formed with an axial bore or cylindrical concavity 15 and a plurality of elongated slots 16 in the wall of the base portion 13, the slots 16 being generally coextensive with the bore and communicating therein.

Pivotally mounted in each slot 16, as by a pivot pin 17, or the like, is a locking lever or finger 18, each locking lever having secured thereto a spring element 19, the spring element reacting against one end of its slot 16 and normally urging the associated lever generally to the position shown in Fig. 2. Locking levers 18 are adapted to engage a stem or rod 21 which is formed with an annular tapering notch 22. The rod or stem 21 is adapted to carry a heavy load and is releasably locked to the support member 12 by the locking levers or fingers 18 being disposed in notch 22 and lockingly engaging a head portion 23. Fingers or levers 18 are held in locking engagement with head 23 of the load rod 21 by means of a cup-like sleeve member 24 invertedly disposed about the support member 12 and slidable with respect thereto, each of the levers 18 being provided with a leg portion 25 which is engaged by and bears against member 24, better understood by reference to Fig. 2.

Encircling support rod 14 is a coiled expansion spring 26, one end thereof bearing against the base of cup member 24 and the other end thereof reacting against base portion 13 for normally urging member 24 in a direction to disengage said member from leg portions 25 of the locking levers or fingers 18. The member 24 is retained in locking engagement with leg portions 25 by means such as a retaining pin 27, or the like, passing through a suitable bore 28 in support rod 14.

In the operation of the mechanism to effect release of a heavy load carried by rod 21 with comparatively little manual power, all that is necessary is a pull on retaining pin 27 sufficient to overcome the friction between the pin and the surfaces of bore 28 and member 24. After retaining pin 27 has been withdrawn, spring 26 is free to expand and forces member 24 away from base 13 whereby member 24 is disengaged from leg portions 25 of locking levers 18. Shortly thereafter, the surfaces of the tapering notch 22 cam the locking fingers outwardly and the condition depicted in Fig. 3 obtains and the heavily loaded rod 21 is released.

Obviously many modifications and variations of the present invention are possible in light of the above teachings. It is therefore to be understood that the invention may be practiced otherwise than as specifically described. For example, while only two locking levers or fingers have been shown, it will be appreciated that more could be employed, if desired. Also, a plurality of releasable locking mechanisms of this invention could be employed to releasably carry a heavy load at spaced points thereon.

It will therefore be appreciated that the foregoing description exemplifies the releasable lock mechanism of this invention, which mechanism requires comparatively little force to effect automatic release of a heavy load, and that each mechanism is simple in construction and can be manufactured economically.

What is claimed as new and desired to be secured by Letters Patent of the United States is:

1. A releasable lock mechanism for a load coupler provided with a stem having means for interfitting locking engagement with locking levers, comprising, in combination, a support structure including a base portion and a rod portion, said base portion being formed with a bore axially aligned with said rod portion and adaptable to receive said stem, said base portion also being provided with a plurality of elongated openings circumferentially disposed thereabout and each extending radially from said bore to the outer periphery of said base portion, a plurality of locking levers pivotally mounted in each of said openings respectively, each of said locking levers having a portion thereof extending into said bore and adapted to interfittingly engage a coupler stem received in said bore for locking said stem therewithin, each of said levers also having an elongated leg portion with an outer surface thereof disposed substantially coincident with the surface of the outer periphery of said base portion when said locking levers are in interfitting locking engagement position with said stem, holding means slidably mounted on said support structure and encompassing said base portion for engaging the outer surfaces of said leg portions and maintaining said locking levers in interfitting locking engagement with said stem, spring means operatively connected to said base portion and to said holding means, said spring means normally urging said holding means toward a position of disengagement from said leg portions for release of said locking levers and the unlocking of said stem, and retaining means engaging said holding means, said retaining means being detachably connected with said rod portion and being effective when connected with said rod portion to render said spring ineffective thereby to retain said holding means in engagement with said leg portions until said retaining means is selectively detached from said rod portion.

2. A releasable lock mechanism as recited in claim 1, wherein said spring means comprises an expansion coil spring encircling said rod portion and disposed within said holding means.

3. A releasable lock mechanism as recited in claim 1, in which said holding means is a cup-like sleeve member, and said spring means is an expansion coil spring disposed within said member and encircling said rod portion, said coil spring being operatively connected to said base portion and to said member.

4. A releasable lock mechanism as recited in claim 1, further including a plurality of spring elements each secured to a respective locking lever, each of said spring elements reacting against said base portion for urging the respective lever to the position in which the outer surface of the leg portion is disposed substantially coincident with the surface of the outer periphery of the base portion.

References Cited in the file of this patent

UNITED STATES PATENTS

| 943,127 | Van Boven | Dec. 14, 1909 |
| 1,311,740 | Asbury | July 29, 1919 |
| 2,366,982 | Pryor | Jan. 9, 1945 |
| 2,499,712 | Armstrong | Mar. 7, 1950 |

FOREIGN PATENTS

| 404,775 | Great Britain | Jan. 25, 1934 |